United States Patent [19]

Snyder et al.

[11] Patent Number: 5,217,585
[45] Date of Patent: Jun. 8, 1993

[54] TRANSITION METAL DECONTAMINATION PROCESS

[75] Inventors: Thomas S. Snyder, Oakmont; William R. Gass, Plum Boro, both of Pa.; Gregory F. Boris; Laura J. Ayers, both of Knoxville, Tenn.

[73] Assignee: Westinghouse Electric Corp., Pittsburgh, Pa.

[21] Appl. No.: 811,474

[22] Filed: Dec. 20, 1991

[51] Int. Cl.$^5$ ............ C25C 1/08; C25C 1/12; C25C 1/14; C25C 1/18
[52] U.S. Cl. .................. 204/112; 204/106; 204/114; 204/120
[58] Field of Search .......... 204/112, 113, 152, 106, 204/114, 115, 118, 107, 117, 120, 122; 423/3, 6, 11, 18, 49, 50, 138, 140, 150; 75/392, 393; 210/665, 682

[56] References Cited

U.S. PATENT DOCUMENTS

| | | | |
|---|---|---|---|
| 3,853,725 | 12/1974 | Skalbo et al. | 204/112 |
| 3,891,741 | 6/1975 | Carlin et al. | 423/2 |
| 3,928,153 | 12/1975 | Gendron et al. | 204/112 |
| 4,148,631 | 4/1979 | Babjak et al. | 75/101 BE |
| 4,162,231 | 7/1979 | Howritz et al. | 252/301.1 |
| 4,162,296 | 7/1979 | Muller et al. | 423/139 |
| 4,196,076 | 4/1980 | Fukjimoto et al. | 210/21 |
| 4,299,724 | 11/1981 | Stana | 252/348 |
| 4,395,315 | 7/1983 | Zambro | 204/112 |
| 4,407,725 | 10/1984 | Allen et al. | 502/25 |
| 4,431,609 | 2/1984 | Scheitlin | 423/2 |
| 4,442,071 | 4/1984 | Lieber et al. | 423/10 |
| 4,476,099 | 10/1984 | Camp et al. | 423/10 |
| 4,519,985 | 5/1985 | Wells et al. | 423/6 |
| 4,528,165 | 7/1985 | Friedman | 423/10 |
| 4,624,703 | 11/1986 | Vanderpool et al. | 75/101 R |
| 4,656,011 | 4/1987 | Garraway et al. | 423/10 |
| 4,764,281 | 8/1988 | Elfline | 210/668 |
| 4,764,352 | 8/1988 | Bathellier et al. | 423/10 |
| 4,789,444 | 12/1988 | Watanabe et al. | 204/107 |
| 4,808,384 | 2/1989 | Vanderpool et al. | 423/21.1 |
| 4,818,503 | 4/1989 | Nyman et al. | 423/10 |
| 5,104,549 | 4/1992 | Kamei et al. | 210/682 |

OTHER PUBLICATIONS

Lowenheim, F., "Modern Electroplating," 3rd Edition, John Wilby & Sons, 1974, pp. 287-289.

Primary Examiner—John Niebling
Assistant Examiner—Patrick J. Igoe
Attorney, Agent, or Firm—J. C. Valentine

[57] ABSTRACT

Nickel (or other transition metal) contaminated with about 5 ppm technetium is decontaminated by dissolving the nickel and the technetium into an aqueous acid solution while introducing a graphite or activated carbon powder into the acid to immediately adsorb the dissolving technetium. The technetium-contaminated powder is separated from the aqueous acid solution and the nickel is then electrowon from the solution. The depleted acid solution is then recycled back to the dissolution step.

10 Claims, 1 Drawing Sheet

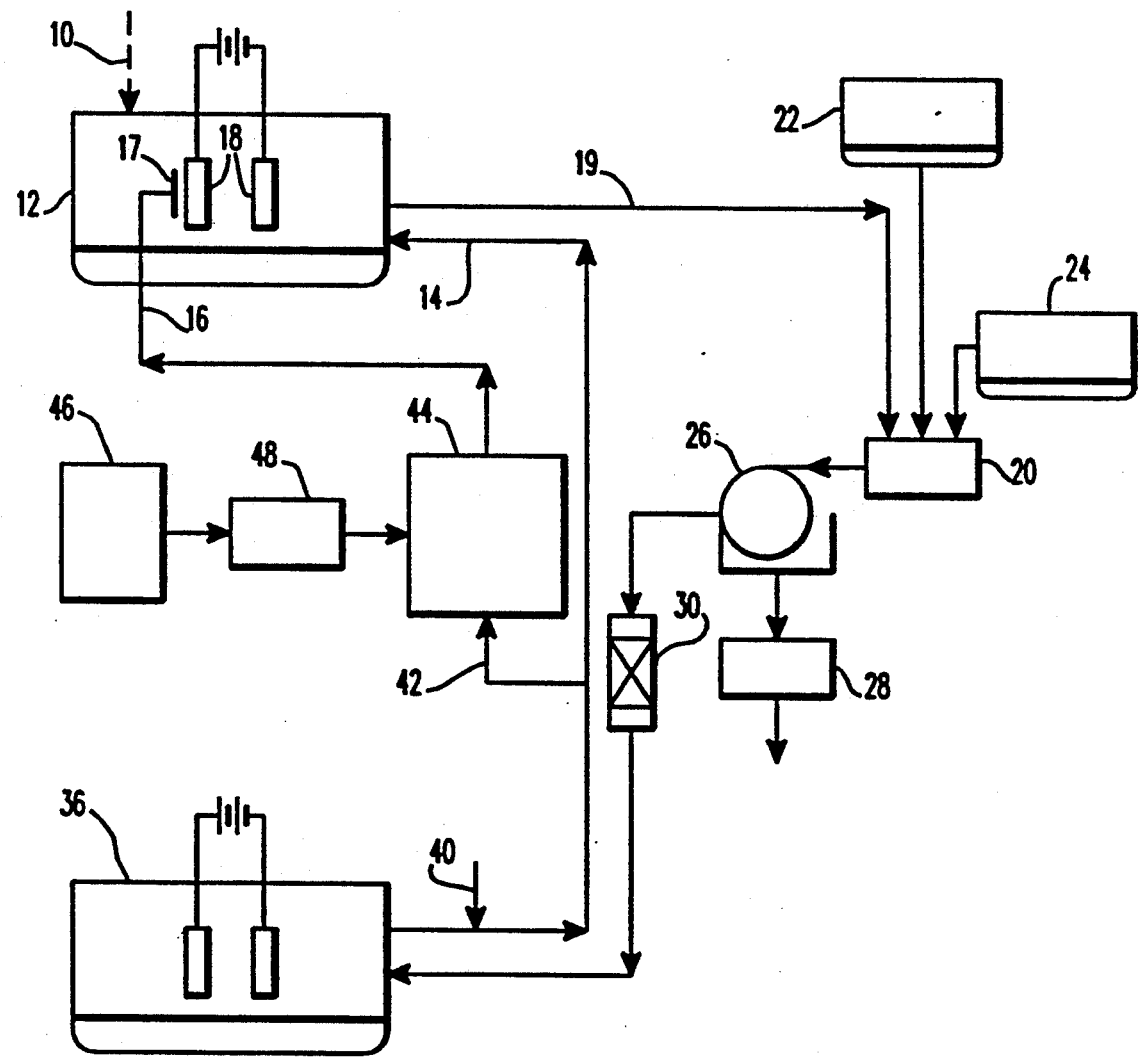

TRANSITION METAL DECONTAMINATION PROCESS

BACKGROUND OF THE INVENTION

The invention relates to a process for decontaminating transition metals contaminated with parts per million concentrations of radioactive elements and, more particularly, to an electrochemical process for decontaminating metals contaminated with radioactive elements such as technetium which tend to plate along with the metal to be decontaminated.

Of particular interest to the present invention is the remediation of radio-contaminated nickel from decommissioning uranium gas diffusion cascades in which nickel is the primary constituent. This is a unique application of metals decontamination from an uncommon source; viz, DOE-DP diffusion cascades. Several such cascades exist; none have, heretofore, been decontaminated. However, the decontamination art taught herein applies equally well to the recovery and decontamination of other multivalent, strategic metals which can be electrowon such as tin, copper, cobalt, chromium, iron, zinc, lead and like transition metals.

The sources of radio-contamination in diffusion barrier nickel generally include uranium with enrichment levels above natural levels (usually about 0.7%) and reactor fission daughter products, such as Tc, Np, Pu, and any other actinides. Because Tc is a man-made (not natural) element, it presents unique challenges for nickel decontamination. For example, contaminated nickel may have an activity due to about 1-5 ppm technetium of up to about 5000 Bq/gm or more, which is more than two orders of magnitude above the maximum international release criteria of 74 Bq/gm metal total activity. Certain countries have specified an even lower criteria of 1.0 Bq/gm or less total activity. If the total activity of a metal exceeds the release criteria, then it is subject to government control for the protection of the public and is considerably less valuable. Because electrochemical plating is required to win back Ni metal, and because Tc has similar electrochemical properties to Ni, new technical apparatus to metal processing are required for these applications.

THE PRIOR ART

Various decontamination processes are known in the art, and specifically for decontamination of nickel. Nickel can be removed by selectively stripping from an acidic solution by electrowinning. See U.S. Pat. No. 3,853,725. Nickel may also be removed by liquid-liquid extraction or solvent extraction. See U.S. Pat. Nos. 4,162,296 and 4,196,076. Further, various phosphate type compounds have been used in the removal of nickel. See U.S. Pat. Nos. 4,162,296; 4,624,703; 4,718,996; 4,528,165 and 4,808,034.

It is also known that metallic nickel, contaminated with fission products, can be decontaminated to remove any actinides present by direct electrochemical processing based on the differences in reduction potential in the electromotive force (emf) series. Actinide removal is favored by two phenomena during electrochemical plating. Actinides have a significantly higher reduction potential relative to nickel and they are normally won from molten salt electrolyte rather than from aqueous electrolyte. See U.S. Pat. Nos. 3,928,153 and 3,891,741, for example. Other electrolytic processes are disclosed by U.S. Pat. Nos. 3,915,828; 4,011,151; 4,146,438; 4,401,532; 4,481,089; 4,537,666; 4,615,776 and 4,792,385.

While the removal of uranium and other actinides has been generally addressed by electrorefining, the removal of technetium has continued to be a substantial problem. When nickel is refined by standard art in a sulfate electrolyte solution, the technetium had been found to track the nickel and codeposit on the cell cathode. Thus, e.g., experiments employing aqueous sulfuric acid solutions at a pH of 2-4 at room temperature have shown that the technetium activity of the deposited metal may be as high as the technetium activity of the feedstock due to the similarity of the Ni and Tc properties. Thus, e.g., product activity levels as high as about 24,000 Bq/gm may result from electrorefining feedstocks with initial activity levels of the order of about 4000 Bq/gm.

Furthermore, two of the more important practical considerations in the commercial feasibility of waste processing operations frequently include the effectiveness of so-called "secondary" processing steps and the volume of wastes which are generated by these secondary processing steps, such as ion exchange processing and like sorption processes for removing unwanted ions. Where, e.g., strong acid ion exchange resins of the type generally employed in nuclear waste processing operations are employed, adsorbed cations may leak from the resin beads where the pH of the solution is from about 2 to about 5. In addition, the resin beads may be degraded by process reagents such as, e.g., oxidants such as peroxides and ozone, which may be added to maintain the oxidation potential of the process streams. Also, it is normally desirable to incinerate contaminated resin beads because they tend to resist compaction and, therefore, volume reduction. However, resin beads cannot easily be incinerated because the resin polymers tend to foul incineration equipment such as incineration grating and also may release noxious offgases. Furthermore, residence time distributions of process streams in ion exchange, carbon beds and the like may result in undesirable side reactions or subsequent reactions which produce other (and perhaps non-extractable) species, such as the reduction of a pertechnetate cation to nonionic technetium oxide. Also, by-passing is a practical concern which may substantially reduce the effectiveness of ion exchange and carbon beds and columns.

Finally, the nickel reduction process requires high metal concentration in solution during purification. This combined with similarities in properties between Ni and Tc make separation extremely difficult.

Accordingly, there remains a need for an economical and efficient method to decontaminate metals and more specifically, to separate technetium from these metals in a simple manner.

SUMMARY OF THE INVENTION

It is a specific object of the present invention to effectively decontaminate transition metals with the generation of little radioactive secondary wastes.

It is a further object to decontaminate transition metals which are contaminated with technetium and other radioactive elements that may be electrochemically won along with the transition metals from aqueous solutions. Such behavior complicates both the radiochemical separations process and the electrochemical metal reduction because of the high metallic concentrations required in solution.

With these objects in view, the present invention resides in a process which comprises the steps of: dissolving a transition metal contaminated with technetium (or other radioactive cation which may be electrochemically won) in an aqueous acid solution, while introducing a powder selected from the group consisting of graphite and activated carbon into the aqueous acid solution, whereby the technetium (or other cation) is preferentially adsorbed by the powder, as the transition metal and the technetium dissolve into the aqueous acid solution; separating the technetium-containing powder from the aqueous acid solution; electrowinning the dissolved transition metal from the aqueous acid solution; and then recycling the aqueous acid solution to the dissolution step.

Advantageously, the technetium is strongly and quickly adsorbed onto the carbon powder as it dissolves. Thus, technetium side reactions and process by-passing, which contaminate the product of traditional decontamination arts, are substantially prevented. Also, there is very little technetium leakage from such powders into the acid electrolyte solutions at normal processing temperatures. Furthermore, such powders do not interfere with anodic dissolution and metal plating operations. In addition, the contaminating powders may be readily incinerated and their radioactive ashes encapsulated by known means. Hence, the end product is purer, and the secondary waste volume generated by the process is minimized.

In a preferred practice of the present invention, the carbon powder is provided by the disintegration of carbon anodes. It was the unexpected disintegration of carbon anodes in a pilot plant process tank that led to the discovery that Tc will partition itself between the carbon powder and the electrolyte. It was also found that high nickel concentrations in the electrolyte will not substantially interfere with the Tc partition.

BRIEF DESCRIPTION OF THE DRAWING

The invention summarized above and set forth in the following claims of invention will become more apparent from the following detailed description of a preferred practice thereof shown, by way of example only, in the accompanying process flow block diagram.

DESCRIPTION OF THE PREFERRED EMBODIMENT

Referring now to the process flow diagram, a transition metal such as nickel which may be contaminated with up to about 10 parts per million or more of technetium, uranium, thorium and other transuranic elements is introduced (as indicated by addition arrow 10) into an anodic dissolution tank 12. In other embodiments, the transition metal may be tin, copper, lead or cobalt. Nickel from the Oak Ridge uranium diffusion cascade, for example, generally comprises 99+% nickel contaminated with up to about 5 ppm technetium, up to about 5 ppm of uranium and thorium and lower concentrations of other transuranics. Unlike uranium and thorium which do not tend to cathodically plate with transition metals such as nickel, technetium must be first separated from an electrolyte solution before the metal is electrowon in an electrochemical tank. In other practices, the transition metal may be simply chemically dissolved in the dissolution tank 12, but anodic dissolution is preferred because the metal can be more quickly dissolved.

The transition metal in the dissolution tank 12 is dissolved in an aqueous acid solution which is preferably sulfuric acid or other oxidizing acid. Other acids which may be suitable for this purpose include nitric acid, sulfamic acid, hydrochloric acid, phosphoric acid and fluoroboric acid. The choice of electrolyte acid will, of course, vary with the transition. The acid solution may be fresh and/or recycled acid. The diagram shows two recycle streams introduced into the dissolution tank 12 via a recycle line 14 and a bleed line 16.

The bleed line 16 is employed to introduce an adsorbent powder such as graphite or activated carbon into the dissolution tank 12 for adsorbing the technetium as it dissolves. Advantageously, the technetium-carbon bond is sufficiently strong that the adsorbed technetium will not leak from the powder at the process temperatures experienced by the aqueous acid solution. Preferably, the powder is introduced by any suitable distributor 17 in close proximity to a dissolution anode 18 (and other dissolution anodes where employed) so that the technetium is immediately adsorbed as it dissolves. Advantageously, the pertechnetate ion is the primary technetium complex in solution at that point. However, it may be reduced if the potential of the electrolyte solution is not maintained.

Preferably, the powder size is in the range of from about 0.1 micron to 100 micron and the slurry in a process line 19 from the dissolution tank 12 comprises from about 0.1 g/l to about 50 g/l of powder. Assuming a surface area of about 500 square meters/gram, it will be seen that the dissolving technetium will be exposed to a large total surface area. Advantageously, such powders do not tend to clog and do not tend to interfere with the electrical properties of the electrolyte solution in the dissolution tank 12.

The powder-containing slurry may be fed to a premix tank 20 where it is mixed with known filter aids such as diatomaceous earth, powdered anion and/or cation exchange resins, from a filter aid make-up tank 22 and flocculents from a flocculent make-up tank 24 (which flocculents may consist of polyelectrolytes, aluminum or zirconium complexes). The slurry is then fed to a filter 26 or other suitable device for separating the technetium-containing solids from the aqueous acid solution. The technetium-containing filter cake many then be washed with water to remove residual acid and ions. About two bed volumes of water or more will sufficiently wash the cake in any instances. Preferably, the filter cake is then incinerated in a high temperature incinerator 28 to produce a technetium-containing ash, which most preferably is then encapsulated in a glass structure by known means for permanent disposal. See, e.g., U.S. Pat. No. 4,792,385 which is incorporated by this reference for its disclosure of incineration and encapsulation systems. Similarly, the wash water may be neutralized, evaporated and the evaporator bottoms encapsulated. Advantageously, the total volume of radioactive wastes produced by this practice is substantially reduced.

The metal-containing acid filtrate from the filter 26 may optionally be fed to an ion exchange polishing column 30 (as shown) and then to an electrochemical cell 36 where the dissolved metal may be electrowon. Advantageously, the filtrate from the filter 26 may be analyzed on-line to verify the decontamination efficiency of the previous operation free of self-shielding due to the presence of the dissolved metal. If the activity of the filtrate is too high, then the process can be easily taken off-stream and corrected before off-specification nickel is plated.

The electrochemical cell 36 may operate between about 25° C. and about 60° C. and at a current density of about 10 amps/square foot to about 300 amps/square foot with an efficiency of about 80% or more at a cell voltage of about 2 volts/cell to about 4 volts/cell. The aqueous acid solution in the electrochemical cell preferably has a pH of between 1 and 6 and, in the case where nickel is recovered from a hydrochloric acid solution, more preferably between 1 and 4.5. Preferably, the solution in the electrochemical cell contains from about 40 g/l to about 105 g/l of contaminated metal. The solution may also contain up to about 60 g/l of boric acid or other suitable plating agent to improve the plating rate and the character of the plating deposit. It is these operating conditions that depart from traditional radiochemical decontamination conditions and necessitate the intimate contact of the electrolyte with the adsorption/exchange media.

The metal-depleted aqueous acid solution from the electrochemical cell 36 may be recycled to the dissolution tank 12 via process line 14. Preferably, the oxidation potential of the aqueous solution in the dissolution tank 12 is controlled by injecting a peroxide into the solution by any suitable means. Thus, e.g., a water soluble peroxide may be dissolved in metal-depleted acid and then added via an addition line 40 to the process line 14.

The metal-depleted recycle stream may be advantageously employed to introduce graphite or activated carbon powder into the dissolution tank 12. Thus, e.g., a metal-depleted solution bleed stream may be diverted via process line 42 from the process line 14 to an in-line mixer 44, which may be a turbine impeller of an injection pump, for intimately mixing the solution with the carbon powder. The powder may be fed from a feed bin 46 by a solids feeder 48 or by other suitable means to the mixer 44, which may then pump the slurry into the dissolution tank 12. In a preferred practice, graphite or activated carbon powder is added in amounts sufficient to produce a slurry in the aqueous solution from the dissolution tank 12 containing from about 0.1 g/l to about 50 g/l powder. More preferably, the powder size is between about 0.1 microns and 100 microns.

The carbon powder may be introduced into the aqueous solution by other suitable means. In an alternative practice, low grade graphite anodes may be employed as an inert anode in either the dissolution tank 12 (in processes where the contaminated metal is anodically dissolved) or in the electrochemical cell 36. These anodes advantageously will disintegrate over time to provide the required adsorbent. In another practice, a graphite frame may be employed to hold the contaminated metal anodes.

In a full scale pilot plant test of a prototype process, a technetium-contaminated nickel sample from the Oak Ridge uranium diffusion cascade was dissolved in a sulfuric acid solution and then slurried with between 0.1 g/l and 50 g/l of a 0.1 micron to 100 micron graphite powder. The slurry was mixed with conventional filter aids and flocculents in a premix tank and then filtered. The filtrate was then fed to an electrochemical cell where decontaminated nickel was electrowon from the sulfate solution. The plated nickel was analyzed at less than 1 Bq/gm (total activity).

In addition, bench scale tests were performed in which technetium-contaminated nickel was dissolved in a sulfuric acid solution which was then slurried with less than about 1 g/100 cc solution of graphite powder. The graphite was then filtered from the solution and the activity of the filtrate and the adsorbent determined to be:

| SAMPLE NO. | FILTRATE ACTIVITY | ADSORBENT ACTIVITY | KD |
|---|---|---|---|
| 1 | 400 | 76 | 0.19 |
| 2 | 1600 | 753 | 0.47 |
| 3 | 1100 | 179 | 0.16 |

Thus the, practice of the present invention will effectively decontaminate metals such as nickel so that they may be released to commercial markets.

While a present preferred embodiment of the present invention has been shown and described, it is to be understood that the invention may be otherwise variously embodied within the scope of the following claims of invention.

What is claimed:

1. A transition metal decontamination process, comprising the steps of:
   dissolving a transition metal contaminated with technetium in an aqueous acid solution, while introducing a powder selected from the group consisting of graphite and activated carbon into the aqueous acid solution, whereby the technetium is adsorbed by the powder as the transition metal dissolves into the aqueous acid solution;
   separating the technetium-containing powder from the aqueous acid solution;
   electrowinning the dissolved transition metal from the aqueous acid solution; and then
   recycling the aqueous acid solution to the dissolution step.

2. The process of claim 1, wherein the transitional metal is a metal selected from the group consisting of nickel, tin, copper, lead and cobalt.

3. The process of claim 2, wherein the transitional metal is nickel.

4. The process of claim 1, wherein the aqueous acid is selected from the group consisting of sulfuric acid, sulfamic acid, hydrochloric acid, phosphoric acid and fluoroboric acid.

5. The process of claim 4, wherein the aqueous acid is sulfuric acid.

6. The process of claim 1, wherein the aqueous acid solution into which the transitional metal is dissolved is slurried with from about 0.1 g/l to about 50 g/l of the powder.

7. The process of claim 6, wherein from about micron to about 100 micron powder is introduced into the aqueous acid solution.

8. The process of claim 1, comprising the further step of injecting a peroxide into the recycled aqueous acid solution before it is employed in the dissolution step to maintain the potential of the solution.

9. The process of claim 1, comprising the further step of incinerating the separated technetium-containing powder to produce a technetium-containing ash.

10. The process of claim 9, comprising the further step of encapsulating the technetium-containing ash.

* * * * *